United States Patent [19]

Barker et al.

[11] Patent Number: 4,924,673
[45] Date of Patent: May 15, 1990

[54] MASTER CYLINDER WITH PARALLEL-BORE RESERVOIR

[75] Inventors: David C. Barker, Utica; Keith V. Leigh-Monstevens, Troy, both of Mich.

[73] Assignee: Automotive Products plc, Warwickshire, United Kingdom

[21] Appl. No.: 156,820

[22] Filed: Feb. 17, 1988

[51] Int. Cl.$^5$ .................. B60T 11/16; B60T 11/18; B60T 11/22; B60T 11/26
[52] U.S. Cl. ........................... 60/589; 60/585; 92/142; 92/161; 92/165 R
[58] Field of Search ............. 60/533, 585, 589; 92/142, 163–164, 169.1, 165 R, 161

[56] References Cited

U.S. PATENT DOCUMENTS

| | | | |
|---|---|---|---|
| 1,985,588 | 12/1934 | Tatter | 60/589 |
| 3,156,097 | 11/1964 | Brown | 92/169 |
| 3,181,299 | 5/1965 | Page | 60/589 |
| 3,427,807 | 2/1969 | Moyes | 60/589 |
| 3,479,068 | 11/1969 | Brittain | 60/585 X |
| 3,795,111 | 3/1974 | Haraikawa | 60/589 X |
| 4,295,336 | 10/1981 | Falk | 60/589 X |
| 4,338,787 | 7/1982 | Kawaguchi | 60/562 |
| 4,463,562 | 8/1984 | Taft | 60/589 X |
| 4,528,895 | 7/1985 | Nakamura | 60/589 X |
| 4,534,172 | 8/1985 | Price et al. | 60/578 |
| 4,590,765 | 5/1986 | Leigh-Monstevens | 60/585 |
| 4,624,291 | 11/1986 | Compton et al. | 60/584 X |
| 4,679,680 | 7/1987 | Komatz | 60/589 X |
| 4,741,161 | 5/1988 | Belart et al. | 60/589 X |

FOREIGN PATENT DOCUMENTS

| | | |
|---|---|---|
| 0121114 | 3/1984 | European Pat. Off. . |
| 0130297 | 1/1987 | European Pat. Off. . |
| 47347 | 4/1981 | Japan .................. 60/589 |
| 71655 | 6/1981 | Japan .................. 60/589 |
| 81/01692 | 6/1981 | PCT Int'l Appl. . |
| 311469 | 10/1971 | U.S.S.R. ............... 60/589 |
| 516174 | 12/1939 | United Kingdom . |
| 1038822 | 5/1964 | United Kingdom . |
| 979810 | 1/1965 | United Kingdom . |
| 1120068 | 7/1968 | United Kingdom ........... 60/585 |
| 1254324 | 11/1971 | United Kingdom . |
| 2000235 | 1/1979 | United Kingdom . |
| 2074675 | 11/1981 | United Kingdom ........... 60/578 |
| 2180900 | 4/1987 | United Kingdom . |

*Primary Examiner*—Robert E. Garrett
*Assistant Examiner*—George Kapsalas
*Attorney, Agent, or Firm*—Krass and Young

[57] ABSTRACT

A master cylinder assembly especially adapted for mounting in the passenger compartment of a motor vehicle in association with the clutch pedal assembly of the motor vehicle. The unit is permanently sealed and is non-serviceable so that no fluid leakage occurs in the passenger compartment as a result of attempts to service the unit. The master cylinder assembly includes a cylinder having an open rearward end and a closed forward end, an external mounting flange intermediate the ends, and an elongated reservoir mounted in piggyback fashion on the cylinder between the mounting flange and the forward end of the cylinder with the rear end of the reservoir pivotally secured to the mounting flange and with a discharge fitting on the forward end of the reservoir moving into telescopic sealing relation with a reservoir fitting on the forward end of the cylinder in response to pivotal movement of the rear end of the cylinder about the pivot axis defined between the rear end of the reservoir and the mounting flange.

18 Claims, 7 Drawing Sheets

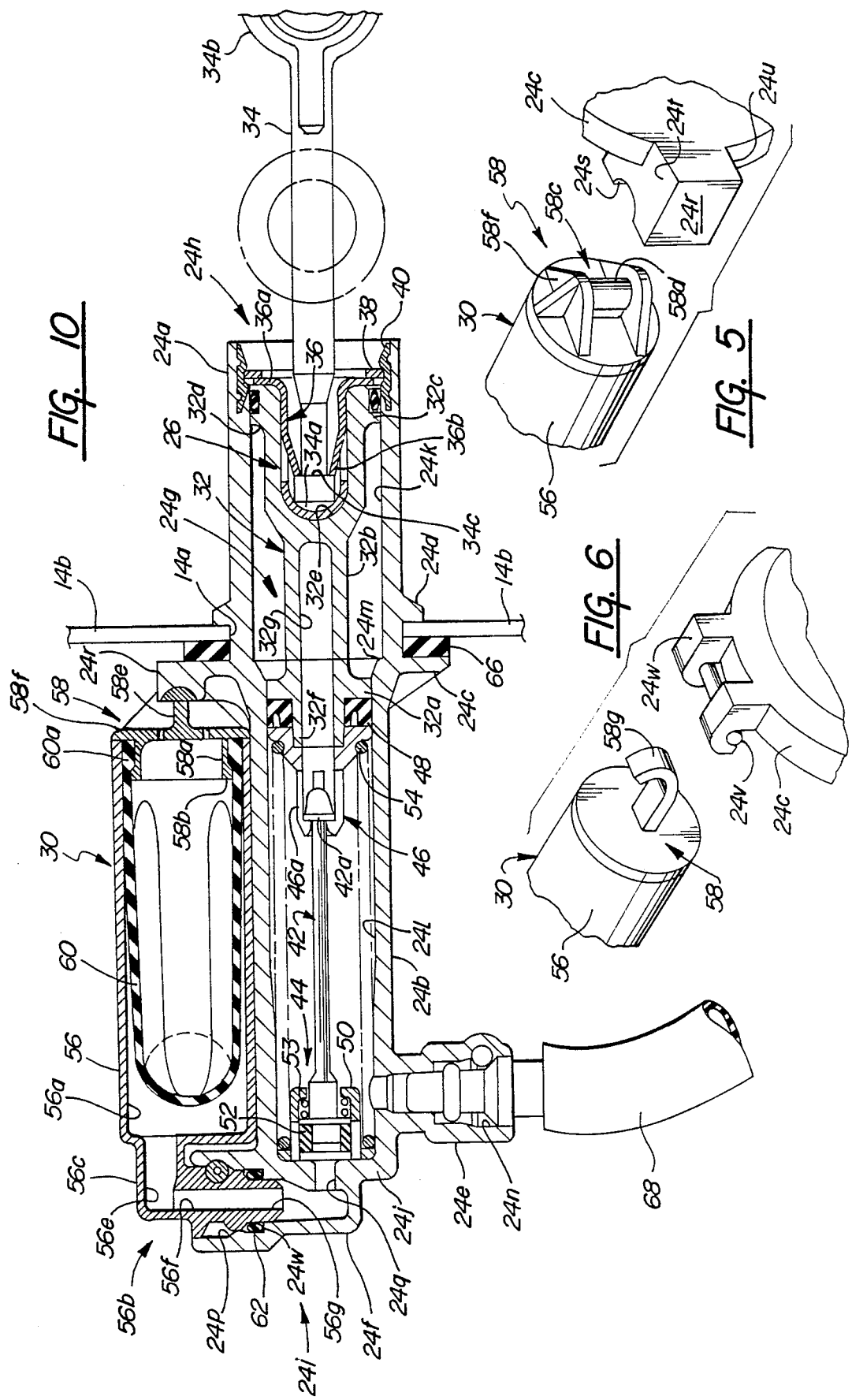

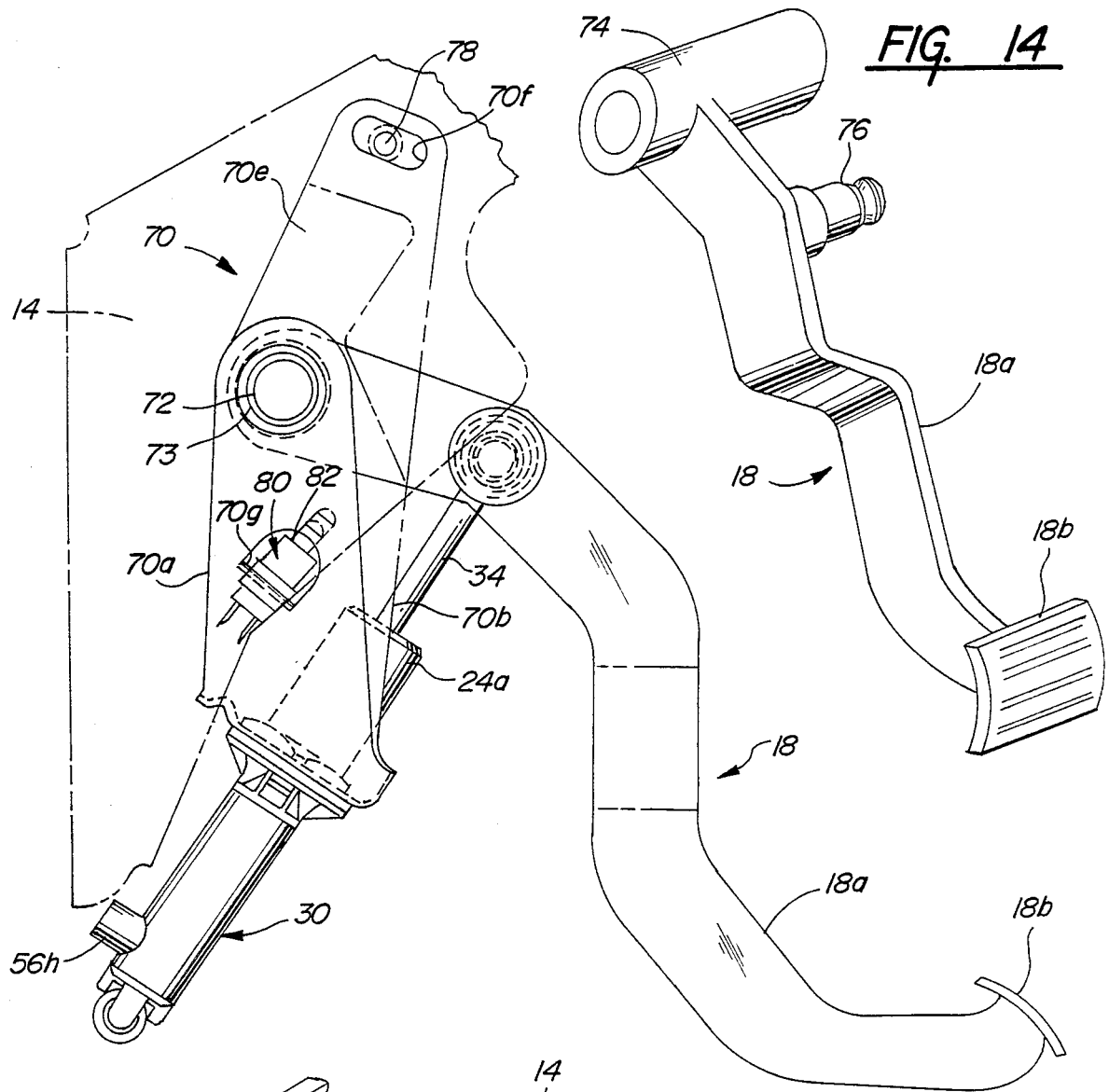
FIG. 14
FIG. 11
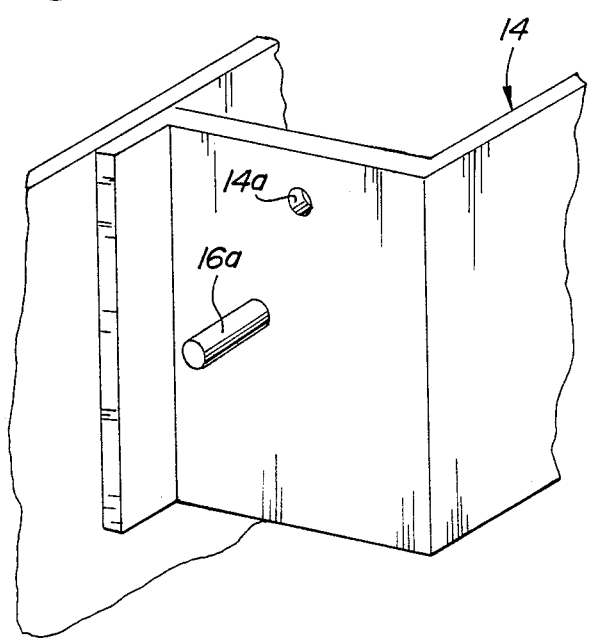
FIG. 13

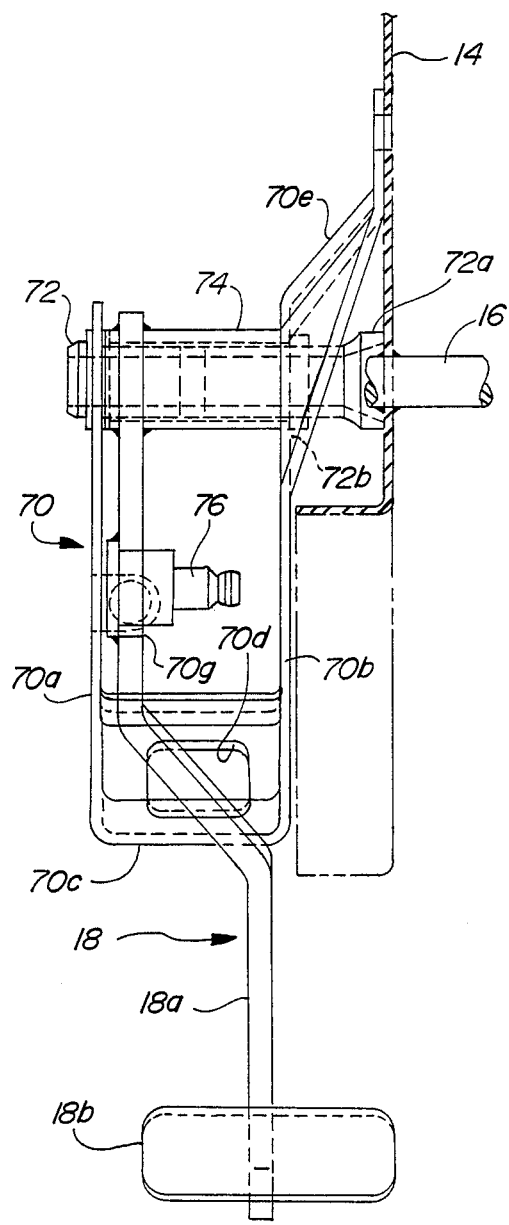
FIG. 12
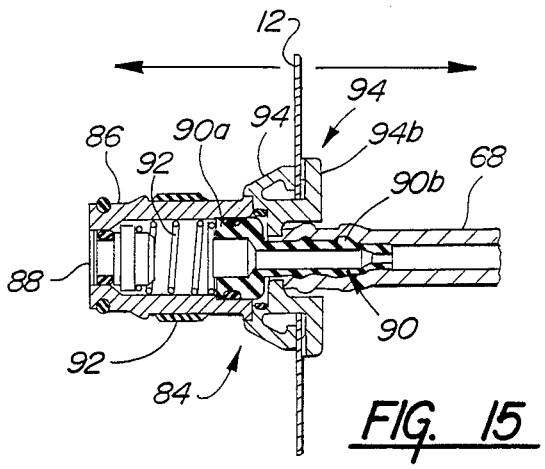
FIG. 15
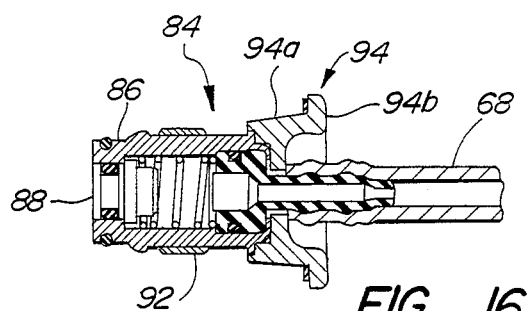
FIG. 16
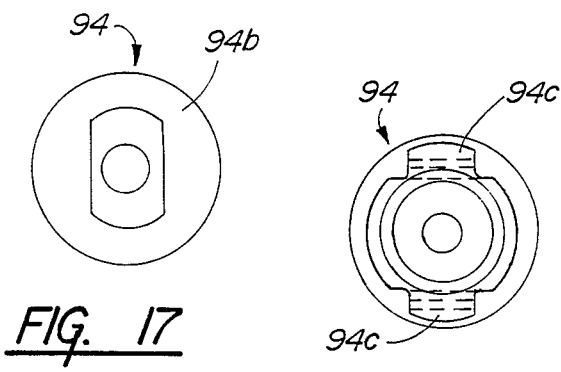
FIG. 17
FIG. 18

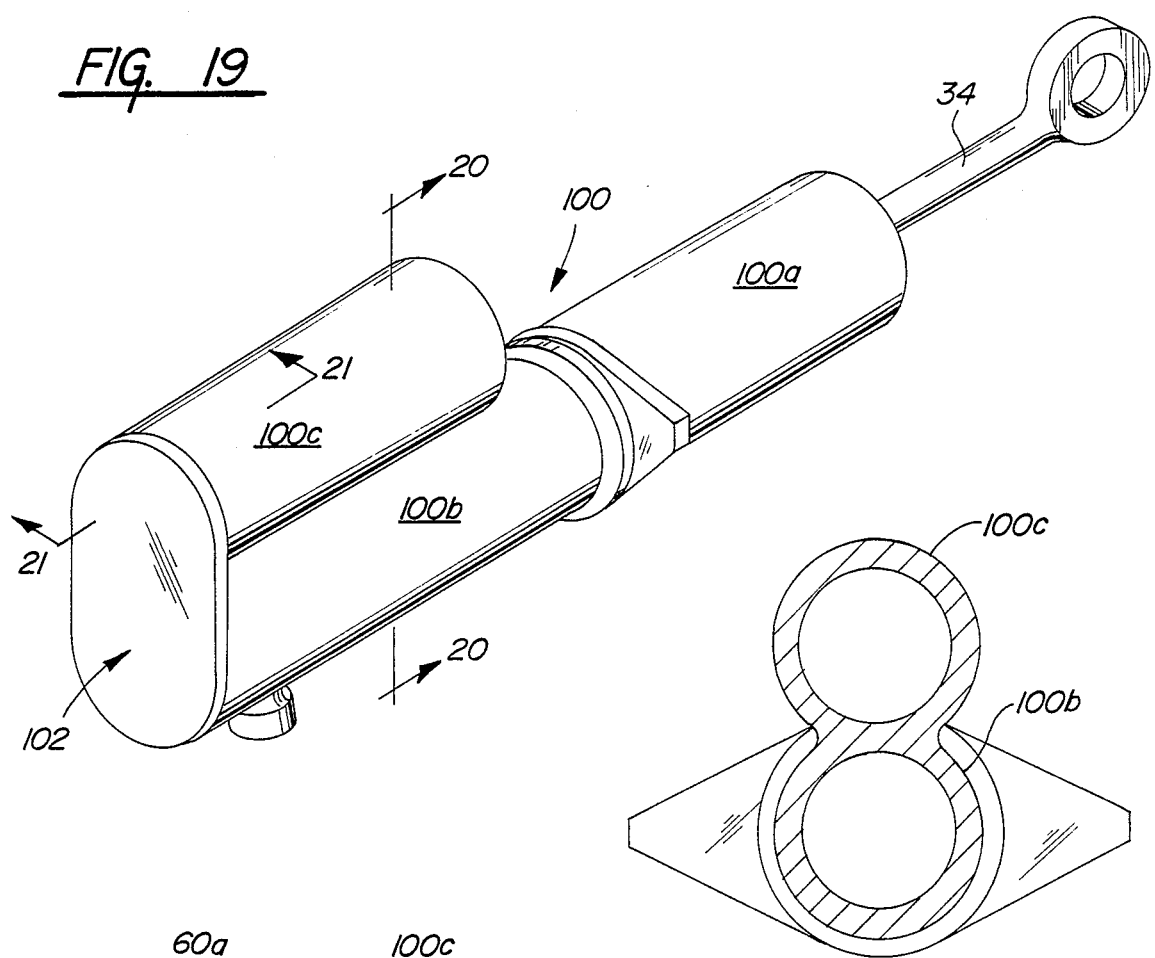
FIG. 19
FIG. 20
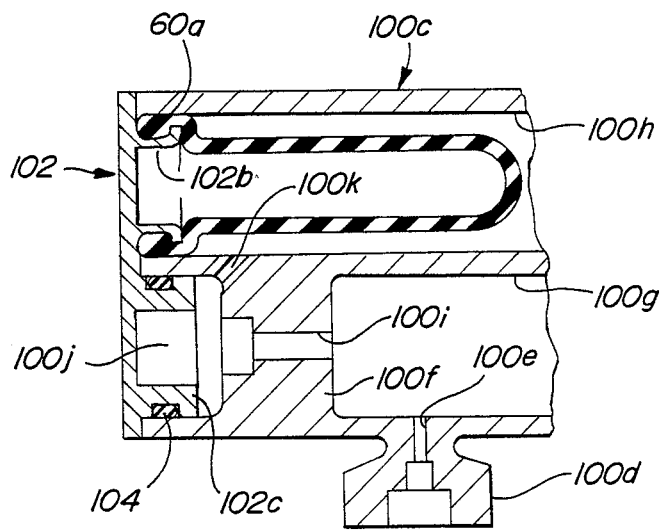
FIG. 21
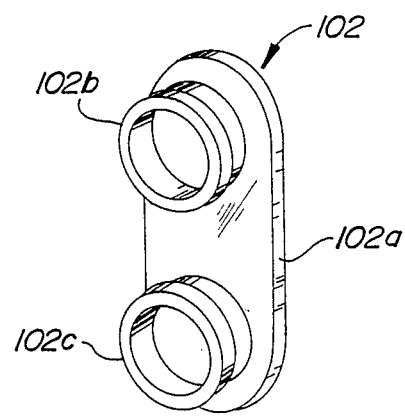
FIG. 22

MASTER CYLINDER WITH PARALLEL-BORE RESERVOIR

BACKGROUND OF THE INVENTION

1. Field of the Invention

This invention relates to hydraulic cylinder assemblies and, more particularly, to hydraulic cylinder assemblies especially suitable for use in association with motor vehicle control systems such, for example, as clutch control systems.

2. Description of the Prior Art

Hydraulic actuator apparatus are known for operating a mechanism at a remote location by way of a master cylinder connected to a slave cylinder installed at the remote location. A conduit interconnects the master cylinder to the slave cylinder and the hydraulic apparatus is filled with hydraulic fluid such that when the piston of the master cylinder, is actuated, the piston of the slave cylinder, and consequently the piston rod or output member, are simultaneously actuated by displacement of hydraulic fluid from the master cylinder to the slave cylinder through the conduit.

More particularly, it is known to provide such hydraulic apparatus for operating the release mechanism of a friction clutch of a motor vehicle. As disclosed in U.S. Pat. Nos. 4,407,125, 4,503,678 and 4,506,507, all assigned to the assignee of the present invention, it is further known to preassemble friction clutch hydraulic release apparatus by filling the master cylinder, the slave cylinder, the conduit interconnecting the cylinders, and a reservoir connected to the master cylinder with hydraulic fluid before shipment of the assembly to a motor vehicle manufacturer for installation in a motor vehicle.

Whereas such prefilled and preassembled hydraulic apparatus contribute importantly to the efficient and inexpensive assembly of the motor vwhicle, the master cylinders of these apparatuses are serviceable by the operator of the motor vehicle and such servicing often causes problems with respect to the functioning of th total system or with respect to leakage of hydraulic fluid from the system.

SUMMARY OF THE INVENTION

The invention is directed to the provision of a master cylinder assembly for use with a prefilled hydraulic apparatus wherein the master cylinder comprises a sealed, non-serviceable unit intended for disposal in the event of malfunction.

This invention is further directed to the provision of a master cylinder assembly which is non-serviceable and which may therefore be positioned in the passenger compartment of the associated motor vehicle without concern for leakage into the passenger compartment upon attempted servicing of the unit.

The hydraulic master cylinder assembly of the invention includes a cylinder having a central axial bore and including a forward end, a rearward end, a discharge port adjacent the forward end, and a reservoir port adjacent the forward end; a piston mounted for sliding reciprocative axial movement in the cylinder bore; and an elongated reservoir having a central axial bore and including a rearward end and a discharge port adjacent its forward end, The reservoir is positioned in piggyback fashion on the cylinder with the bores extending generally parallel to each other and with the reservoir discharge port connected to the cylinder reservoir port to provide fluid communication between the reservoir bore and the cylinder bore. This ararangement provides a simple and compact package which may be readily formed as a sealed non-serviceable unit.

According to a further feature of the invention, means are provided for mounting the reservoir in piggyback fashion on the cylinder. The mounting means includes first coacting means on the rearward end of the reservoir and on the cylinder mounting the rearward end of the reservoir for pivotal movement relative to the cylinder about a pivot axis generally normal to the axis of the cylinder bore. This pivotal mounting arrangement allows the reservoir to be quickly moved into mounting relationship to the cylinder to facilitate the ready and inexpensive assembly of the master cylinder assembly.

According to a further feature of the invention, the mounting means includes second coacting means on the forward end of the reservoir and on the forward end of the cylinder operative in response to pivotal movement of the rearward end of the reservoir about the pivot axis to connect the reservoir discharge port to the cylinder reservoir port. This arrangement allows the reservoir and cylinder to move into coupled, sealed relationship upon pivotal movement of the reservoir about its rearward end.

According to a further feature of the invention, the second coacting means comprises a fitting on the forward end of the reservoir defining the discharge port for the reservoir and a fitting on the forward end of the cylinder defining the reservoir port for the cylinder, and the fitting on the forward end of the cylinder is movable into telescopic relation with the reservoir fitting in response to pivotal movement of the rearward end of the reservoir about the pivot axis. This arrangement facilitates the movement of the reservoir into a sealed disposition with respect to the cylinder.

According to a further feature of the invention, the central axial bore of the cylinder includes a relatively large diameter rearward portion and a relatively small diameter forward portion forming a rearwardly facing annular bore shoulder surface at its juncture with the rearward bore portion, and the first coacting means on the cylinder includes a journal means disposed radially outwardly of the outer surface of the cylinder proximate the juncture of the large diameter and small diameter bore portions. This arrangement provides a compact master cylinder assembly package and simplifies formation of the cylinder of a plastic material in a molding operation.

According to a further feature of the invention, the cylinder includes an annular radially extending external mounting flange proximate the juncture of the large diameter and the small diameter bores, and the journal means receiving the rear end of the reservoir is provided on the mounting flange. This arrangement provides a convenient means of providing a mounting flange for the master cylinder assembly while simultaneously providing a journal mount for the rearward end of the reservoir and further allows the flange to be formed in a molding operation without producing sink marks on the inner periphery of the cylinder in the region traversed by the piston.

According to a further feature of the invention, the journal means comprises an arcuate forwardly opening concave journal surface on the mounting flange and the coacting means on the rear end of the reservoir comprises an arcuate rearwardly facing convex journal surface sized to journal in the concave journal surface on the mounting flange. This arrangement provides an inexpensive and efficient means of pivotally mounting the rear end of the reservoir for movement into its sealed position with respect to the cylinder.

According to a further feature of the invention, the piston of the cylinder assembly has a relatively small diameter forward portion mounted for sliding reciprocal movement in the cylinder forward bore portion, a relatively large diameter rearward portion mounted for reciprocal sliding movement in the cylinder rearward bore portion, and a forwardly facing annular shoulder surface. This arrangement allows the annular shoulder surface on the piston to coact with the bore shoulder surface in the cylinder to define the extreme forward position of the piston in the cylinder bore.

The invention also discloses an inexpensive and compact master cylinder assembly comprising an elongated cylinder having a central axial bore, a forward end, rearward end, and an external annular mounting flange intermediate its ends; and an elongated reservoir positioned in piggyback fashion on the cylinder and extending generally between the mounting flange and the closed forward end of the cylinder.

The invention further discloses a unique control assembly for a motor vehicle including a bracket; a hydraulic cylinder assembly including a cylinder mounted on the bracket and a piston rod projecting out of the cylinder; a pedal assembly including a pedal arm mounted for pivotal movement on the bracket about a pivot axis and pivotally connected to the free end of the piston rod at a location spaced from the pivot axis; and means for mounting the bracket for adjustable pivotal movement about the pivot axis. This arrangement provides a convenient means of mounting a master cylinder assembly in readily adjustable fashion within the passenger compartment of the motor vehicle.

The invention also discloses a further unique control assembly for a motor vehicle including a bracket structure; a pedal including a pedal arm pivotally mounted proximate its upper end to the bracket structure and having a pedal pad at its lower end; a hydraulic cylinder assembly including a hollow cylinder having a contral axial bore and including an open rearward end and a closed forward end, a piston slidably mounted in the bore, a piston rod connected at its forward end to the piston and extending out of the open rearward end of the cylinder, and an elongated reservoir positioned in piggyback fashion on the cylinder with the bores extending generally parallel to each other; and means mounting the cylinder assembly on the bracket structure with the rearward end of the piston rod pivotally connected to the pedal arm. This arrangement provides a convenient means of mounting the master cylinder assembly totally within the passenger compartment of the motor vehicle.

In the disclosed embodiments of the invention, the cylinder includes an external annular flange between its forward end and its rearward end; the reservoir extends along the cylinder from the flange to a location proximate the forward end of the cylinder; the cylinder assembly is mounted on a vertically extending plate portion of the associated bracket structure; and the portion of the cylinder rearwardly of the flange passes through an aperture in the bracket structure plate portion with the flange positioned against the forward face of the plate portion to position the reservoir forwardly of the plate portion.

BRIEF DESCRIPTION OF THE DRAWINGS

FIG. 5 is a fragmentary perspective view of a pivotal mounting structure employed in the master cylinder assembly of FIG.1;

FIG. 6 is a fragmentary perspective view of an alternate form of a pivotal mounting structure;

FIG. 10 is a cross-sections view taken on line 10—10 of FIG. 7;

FIGS. 11–14 disclose an alternate form of the invention master cylinder assembly;

FIGS. 15–18 illustrate a quick connect coupling for use with the invention master cylinder assembly; and FIGS. 19–22 illustrate a further alternate form of the invention master cylinder assembly.

DETAILED DESCRIPTION OF THE PREFERRED EMBODIMENT

Figure 1:
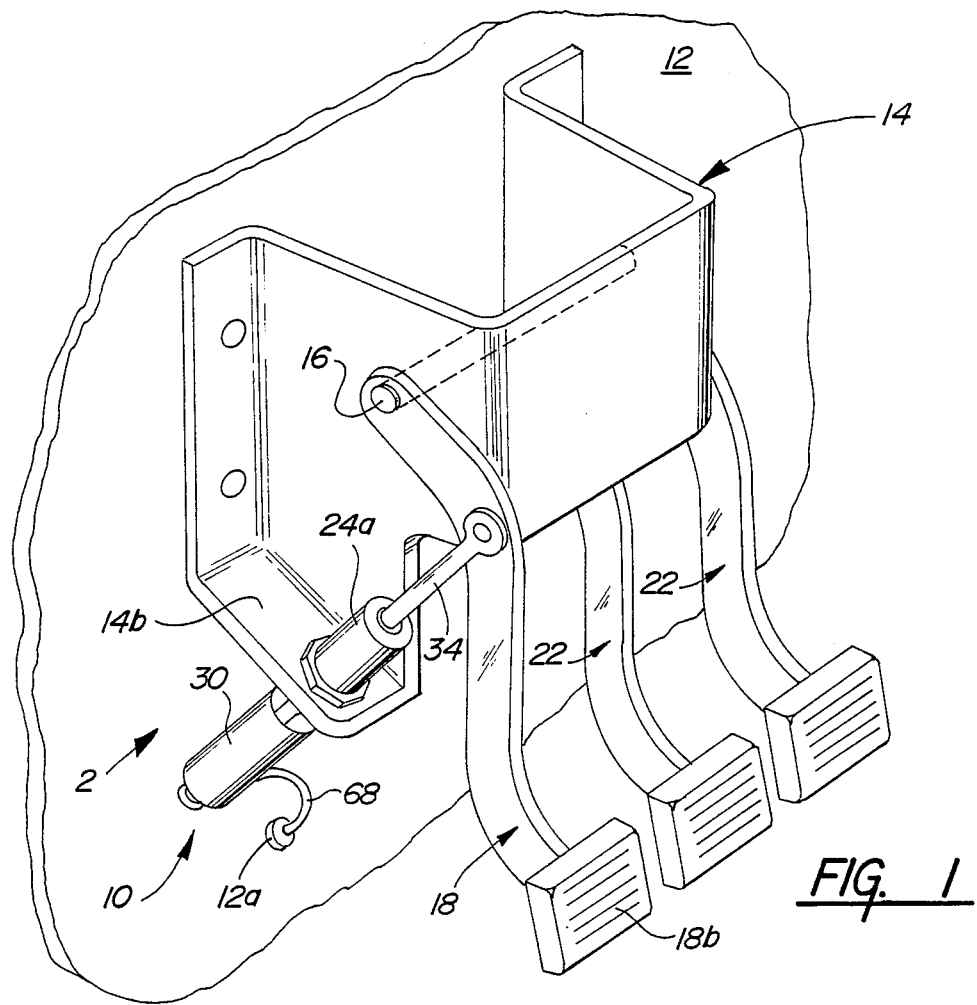
FIG. 1 is a fragmentary perspective view of a master cylinder assembly according to the invention shown in association with a motor vehicle control assembly.
Figure 2:
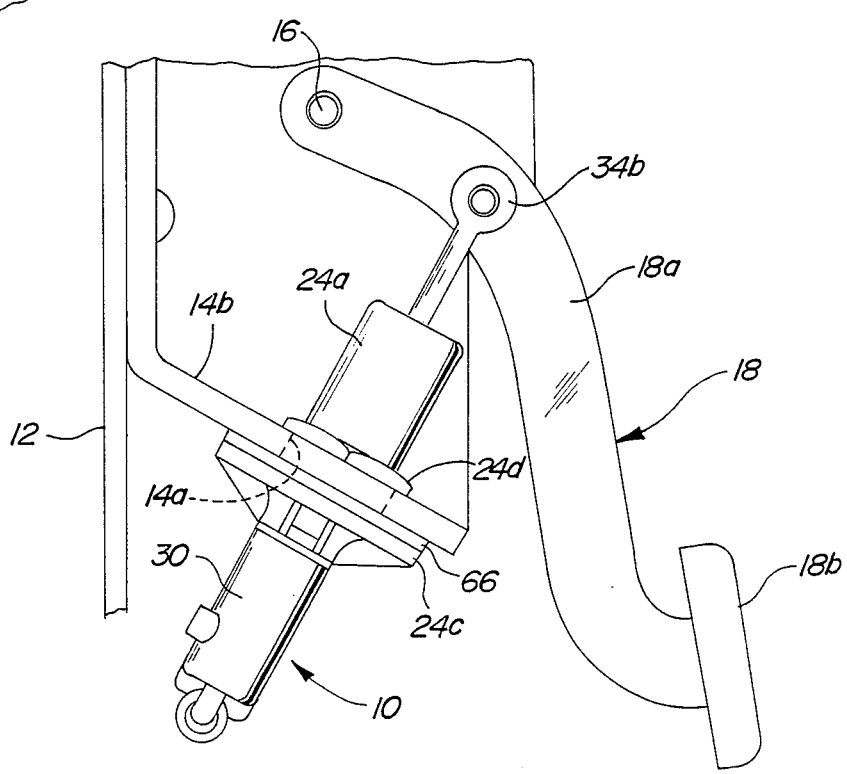
FIG. 2 is a view looking in a direction of the arrow 2 of FIG. 1.
Figure 3:
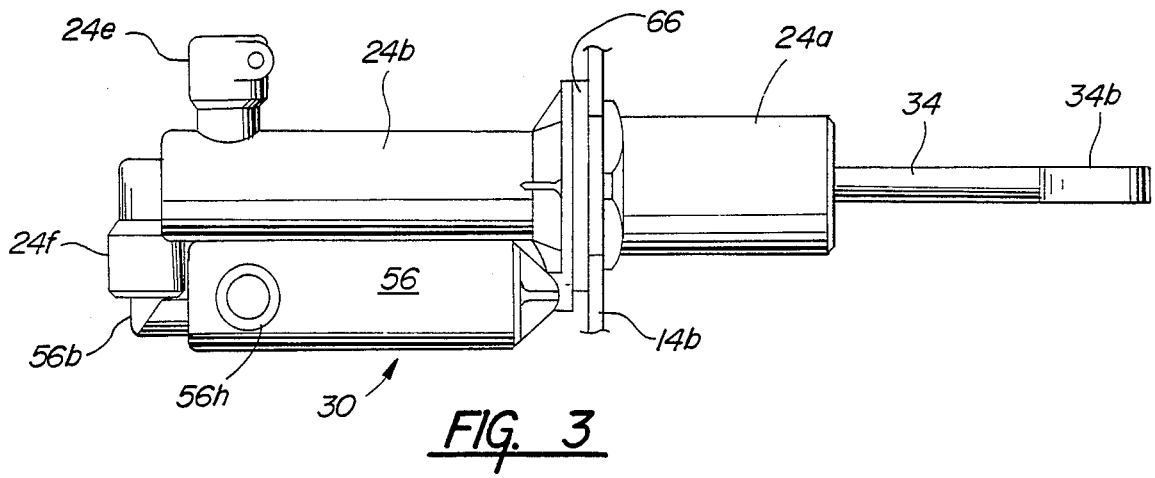
FIG. 3 is a plan view of the master cylinder assembly of FIG. 1.
Figure 4:
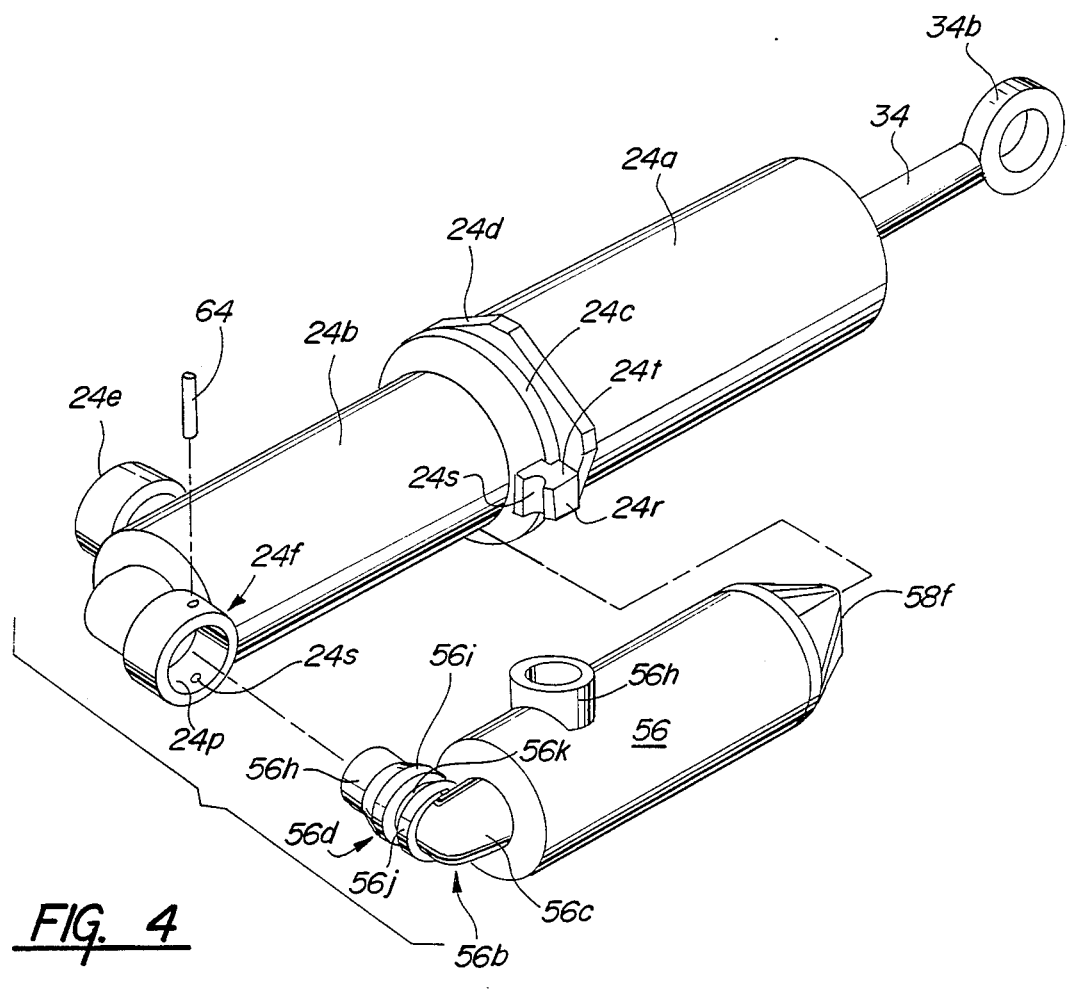
FIG. 4 is a perspective exploded view of the master cylinder assembly of FIG. 1.
Figure 7:
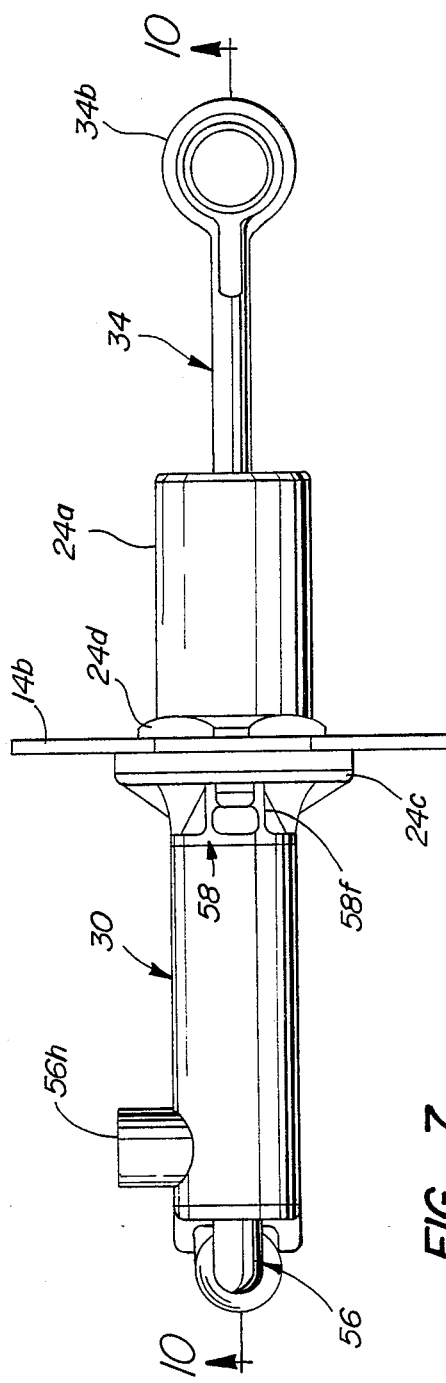
FIG. 7 is a side elevational view of the master cylinder assembly of FIG. 1.
Figure 9:
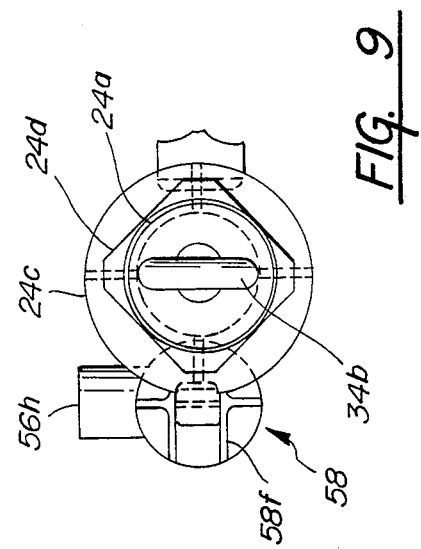
FIGS. 8 and 9 are end views looking respectively from the left and right of FIG. 7.

The master cylinder assembly 10 of the invention is seen in FIG. 1 in association with a motor vehicle of the type including a fire wall 12, a pedal box or bracket structure 14, a pivot shaft 16 carried by the bracket structure, a clutch pedal assembly 18 secured at its upper end to shaft 16, a brake pedal assembly 20 secured at its upper end to shaft 16, and an accelerator pedal assembly 22 secured at its upper end to shaft 16.

Master cylinder assembly 10, broadly considered, includes a cylinder 24, a piston assembly 26, a valving assembly 28, and a reservoir 30.

Cylinder 24 is perferably formed of a suitable plastic material in a molding operation and includes a relatively large diameter rearward end portion 24a, a relatively small diameter forward end portion 24b, a mounting flange 24c, a flange lock 24d, a discharge fitting 24e, and a reservoir fitting 24f.

Cylinder 24 defines a central axial bore 24g, an open rearward end 24h, and a forward end 24i closed by an end wall 24j.

Central bore 24g includes a relatively large diameter rearward portion 24k defined by relatively large diameter cylinder portion 24a and a relatively small diameter bore portion 24l defined by relatively small diameter cylinder portion 24b. An annular rearwardly facing shoulder surface 24m is defined at the juncture of bore portions 24k and 24l. Discharge fitting 24e projects integrally and laterally from the main body portion of cylinder 24 adjacent the closed end 24i of the cylinder and defines a discharge port 24n communicating with the interior of cylinder bore 24l. Reservoir fitting 24f is molded integrally with end wall 24j and defines a reservoir port or passage 24p including a central port 24q formed in end wall 24j.

External mounting flange 24c is formed adjacent the juncture of large diameter cylinder portion 24a and small diameter cylinder portion 24b and extends in annular fashion totally around the cylinder. Mounting flange 24c further defines a journal member 24r molded integrally with the mounting flange at a location radially outwardly from the exterior surface of the cylinder and defining a forwardly facing concave arcuate journal surface 24s. Locking flange 24d has a generally rectangular, oblong configuration and is spaced rearwardly from mounting flange 24c.

Piston assembly 26 includes a piston 32 and a piston rod 34. Piston 32 is formed of a plastic material in a molding operation and includes a relatively small diameter forward flange portion 32a slidably received in cylinder forward bore 24l; a central spool portion 32b of reduced diameter, and a relatively large diameter rear end portion 32c slidably received in cylinder rearward bore 24k. Rearward portion 32c forms an annular forwardly facing shoulder surface 32d which coacts with bore shoulder 24m to define the extreme forward position of the piston within bore 24g. A retainer 36 is received in a hollow rearwardly opening bore 32e of piston 32 and includes an annular portion 36a engaging the rear annular end face of the piston and coacting with a snap ring 38 received in an annular groove defined by a retainer member 40 to define the extreme rearward position of the piston within the bore of the cylinder.

Piston rod 34 includes a forward spherical end 34a and a rearward end 34b in the form of an eye. Spherical forward end 34a mounts pivotally within retainer member 36 and is precluded from rearward movement relative to the retainer member by retainer spring finger portions 36b engaging an annular shoulder 34c formed at the rear end of spherical end 34a.

Valving assembly 28 includes a valve stem 42, a valve assemble 44, and a retainer member 46.

Retainer member 47 is secured to a front, nose portion 32f of piston 32 as by sonic welding and coacts with nose portion 32f and flange portion 32a to define a seal groove for receipt of an elastomeric seal 48.

Valve assembly 44 includes a retainer member 50 seated against end wall 24j and an annular elastomeric member 52 carried on the forward end of valve stem 42 and sealingly coacting with resevoir port 24q to selectively open and close that port. Valve stem 42 extends rearwardly in bore 24l from valve assembly 44 and includes a head portion 42a at its rearward end snappingly engaged by finger portions 46a of retainer 46.

Piston 32 includes a central forwardly opening bore 32g sized to slidably receive valve stem end portion 42a. A return coil spring 54 is positioned in bore 24l and extends from seating engagement at its forward end with retainer 50 to seating engagement at its rearward end with retainer 46. It will be understood that with the piston in its fully retracted position as illustrated in FIG. 10, fingers 46a of retainer 46 engage head portion 42a valve stem 42 to maintain annular elastomeric member 52 in axially spaced disposition with respect to reservoir port 24q so as to establish communication between cylinder bore 24l and the reservoir port and that, as the piston is advanced forwardly in the cylinder in response to appropriate stroking input from piston rod 34, valve stem head portion 42a moves telescopically into piston bore 32g and elastomeric member 52 is moved into sealing engagement with reservoir port 24q by an internal coil spring 53 in valve retainer 50 so as to cut off communication tween cylinder bore 24l and reservoir 30.

Reservoir 30 is formed in a molding operation of a suitable plastic material and includes a main body sleeve portion 56 defining a central axial bore 56a, a discharge fitting 56b provided at the front of the reservoir and formed integrally with sleeve 56, and a rear end cap 58. Sleeve 56 has a diameter approximating the diameter of cylinder reduced diameter portion 24b and has a length dimensioned to fit comfortably between cylinder reservoir fitting 24f and cylinder mounting flange 24c.

Discharge fitting 56b includes an axially extending portion 56c extending forwardly from the forward end of the reservoir and a radially extending portion 56d. Axially extending portion 56c defines a passage 56e communicating with a radial passage 56f defined by radially extending fitting portion 56d. Passage 56f terminates in a discharge port 56g. Radially extending fitting portion 56d includes a nose portion 56h, an external flange 56i, and a further external flange 56j forming an annular groove 56k in coaction with flange 56i.

End cap 58 fits telescopically within the rear end of sleeve 56 and includes an annular skirt portion 58a defining an annular bead 58b for trapping receipt of the lip portion 60a of an elastomeric diaphragm 60 positioned within reservoir bore 56a. End cap 58 further defines a journal member 58c including a convex rearwardly facing arcuate journal surface 58d sized to fit snugly within concave journal surface 24s defined by journal means 24r. Journal member 58c is supported by a central rib 58e and by spaced triangular flanges 58f which extend rearwardly beyond arcuate journal surface 58d.

To assemble the invention master cylinder assembly, assuming that piston assembly 26 and valving assembly 28 have previously been installed within the cylinder 24, convex journal surface 58d on reservoir 30 is positioned in concave journal surface 24s on cylinder 24 and the reservoir is thereafter pivoted about the axis defined by journal surfaces 58d and 24s to bring reservoir discharge fitting 56d into telescopic relation with cylinder fitting 24f. Flanges 58f coact with the upper and lower surfaces 24t and 24u of journal 24r to preclude vertical displacement of journal 58c relative to journal 24r. As reservoir fitting 56d moves telescopically into cylinder fitting 24f, an O-ring 62 positioned on nose portion 56h of fitting 56d moves into seating and sealing engagement with a shoulder 24w defined within fitting 24f to sealingly position fitting 56d within fitting 24f, whereafter a pin 64 is passed through openings 24s in fitting 24f and into tangential position with respect to groove 56k. Pin 24 precludes axial withdrawal of fitting 56d from fitting 24f and allows the reservoir 30 to pivot about the axis of fitting 56d. Reservoir 30 is thus mounted in permanently sealed, piggyback fashion with respect to cylinder 24.

In the alternate form of journal structure seen in FIG. 6, the journal provided on flange 24c comprises a pin 24v carried by radially outwardly extending and circumferentially spaced finger portions 24w and the journal provided on reservoir 30 comprises a hook member 58g extending rearwardly from end cap 58 and sized to engage under and around pin 24v to provide a pivotal connection for the reservoir to the cylinder.

In the utilization of the invention master cylinder assembly in the vehicle control assembly seen in FIG. 1, an annular resilient member 66 is positioned on the rearward face of mounting flange 24c; piston rod 34 and rearward cylinder portion 24a are passed rearwardly and upward through a rectangular opening 14a in a downwardly and rearwardly angled plate portion 14b of bracket structure 14 to bring resilient member 66 into sealing and seating engagement with the under, forward face of plate portion 14b to position reservoir 30 and cylinder forward portion 24b forwardly and below bracket plate portion 14b; the master cylinder assembly is thereafter turned through approximately 45 degrees to allow locking flange 24d to lockingly engage the upper face of plate portion 14b; a high pressure conduit 68 is inserted into discharge port 24n and passed through an opening 12a in fire wall 12 for attachment in known manner to a slave cylinder (not shown) situated in the engine compartment of the vehicle adjacent the clutch of the vehicle; and eye 34b of piston rod 34 is suitably secured to the pedal arm 18a of clutch pedal assembly 18 between shaft 16 and clutch pedal 18b so that pivotal movement of the clutch pedal assembly about the axis of shaft 16 serves to reciprocate piston 26 within the bore of the cylinder and selectively deliver pressurized fluid through conduit 68 to disengage and engage the clutch upon operator command.

In the alternate form of the invention seen in FIGS. 11-14, the master cylinder assembly 10, rather than being mounted on an angled plate portion, such as the portion 14b of the pedal bracket structure is mounted on a separate bracket which is adjustably secured to the primary pedal bracket structure. Specifically, the master cylinder assembly is mounted on a bracket 70 which in turn is secured to the pedal box or pedal bracket 14.

Bracket 70 has a generally U configuration and includes an arm portion 70a, a further arm portion 70b, and a bight portion 70c. Master cylinder assembly 10a is mounted through an aperture 70d in bight portion 70c with cylinder rearward end portion 24a projecting rearwardly and upwardly from bight portion 70c and cylinder forward end portion 24b projecting downwardly and rearwardly from bight portion 70c. A sleeve 72 extends between the upper end of arm portion 70a and the confronting portion of arm portion 70b and includes a portion 72a extending beyond arm portion 70b. Sleeve 72 passes through aligned apertures in bracket portions 70a and 70b and is held in position relative to bracket 70 by a snap ring 73 and a collar portion 72b of the sleeve. Sleeve 72 defines a central bore 72c. Pedal arm assembly 18 includes a pedal arm 18a, a pedal 18b, a journal sleeve 74, and a pivot pin 76. Journal sleeve 74 is welded to the upper end of pedal arm 18a and is journalled on sleeve 72 between bracket arm portion 70a and 70b to provide the required pivotal movement of the pedal arm. Pivot pin 76 is welded to pedal arm 18a intermediate the ends of arm 18a and pivotally receives the eye 34b of piston rod 34. Alternatively, as seen in FIG. 14, pedal arm assembly 18, including arm 18a, pedal 18b sleeve 74, and pin 76, may comprise a unitary molded part formed of a glass or carbon fiber reinforced plastic material.

Arm portion 70b extends upwardly above bushing 72 in the form of an inwardly angled portion 70e which includes a slot 70f at its upper end. Slot 70f is arcuate and is centered on the pivot axis defined by sleeve 72. In this form of the invention, pivot shaft 16 includes a portion 16a projecting laterally from pedal box 14, and an aperture 14a is provided in pedal box 14 generally above pivot shaft extension 16a. To mount the bracket 70 with the master cylinder assembly mounted thereon on the pedal bracket 14, sleeve 72 is passed over pivot shaft extension 16a and a suitable fastener 78 is passed through bracket aperture 14a and through slot 70f to secure the bracket 70 to the pedal bracket 14. The position of the bracket 70 relative to the pedal bracket 14, and thereby the position of clutch pedal assembly 18, may be selectively varied by loosening the fastener 78 and rotating the bracket 70 about the axis of shaft extension 16a with the pivotal movement of the bracket being accommodated by movement of fastener 74 in arcuate slot 70f. When the desired position of annular adjustment of the bracket relative to the pedal bracket has been achieved, fastener 78 is again tightened to lock the bracket 70, and thereby the master cylinder assembly, in the desired position of angular adjustment to provide clutch disengagement in response to a precise and consistent amount of pedal stroke irrespective of manufacturing tolerances in each vehicle in which the master cylinder assembly is installed.

The master cylinder assembly 10 of the FIGS. 11-14 embodiment further includes an electrical limit switch 80 secured to a tab 70g struck from arm portion 70a of bracket 70 and including a contact plunger 82 positioned in the path of pivotal movement of pedal arm 18a as the arm pivots about its pivot axis. Switch 80 includes adjustment means so that the position of plunger 82 relative to arm 18a in the fully retracted position of the master cylinder assembly may be adjusted and preset to provide actuation of the clutch interlock circuit of the associated vehicle at such time as the clutch is fully disengaged.

The quick connect coupling shown in FIGS. 15-18 is utilized to facilitate mounting of the conduit 68 in the vehicle bulkhead 12.

The quick connect coupling, generally designated by the reference numeral 84, includes a main body member 86 generally cylindrical construction, a plug member 88 positioned in one end of main body member 86, a fitting 90 including an enlarged diameter tubular portion 90a positioned in the other end of main body member 86 and a reduced diameter tubular portion 90b receiving the free end of conduit 68, a coil spring 92 positioned within member 86 and biasing plug 88 into a position sealing the adjacent end of member 86, and a collar 94 suitably secured to member 86 in surrounding relation to reduced diameter fitting portion 90b. Collar 94 includes a main body tubular portion 94a, an annular flange portion 94b at one end of tubular portion 94a, and a pair of diametrically opposed ear portions 94c at the other end of tubular portion 94a. In use the free end of cunduit 68 is fitted over reduced diameter portion 90b of fitting 90 and the coupling is passed through an aperture in the bulkhead 12 having a diameter less than the diameter of flange portion 94b of collar 94 and less than the relaxes diametrical extent of ears 94c. As the coupling is passed through the aperture in the bulkhead, ears 94c flex radially inwardly in cantilever fashion to allow the ears to pass through the aperture, whereafter the ears snap radially outwardly to trap the bulkhead 12 between ears 94c and flange 94b and securely position the coupling in the bulkhead 12, whereafter a female coupling, not shown, may be fitted over coupling 84 in known manner to move plug 88 away from the open end of member 86 and provide fluid communication through coupling 84.

It will be understood that master cylinder assembly 10 would normally be delivered to the motor vehicle manufacturer as part of a prefilled and pretested package including the master cylinder assembly, conduit 68, and associated slave cylinder with the filling of the total package being accomplished by appropriate bleeding at the slave cylinder and then filling of the package through the reservoir port 56h formed integrally with reservoir sleeve 56. Depending on the installation, the prefilled and pretested package may also include one or more quick disconnect fittings to enable the components of the package to be separated during assembly and then reconnected without loss of their prefilled condition.

Figure 8:
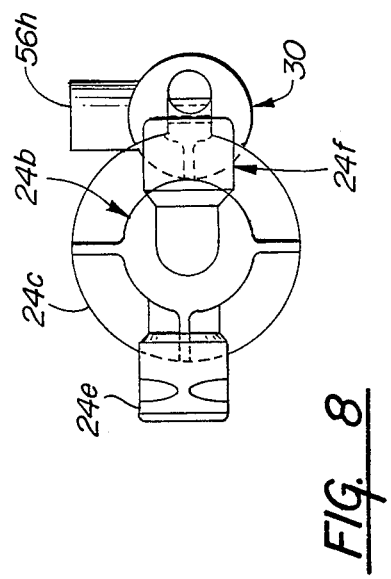

A further form of master cylinder assembly according to the invention is seen in FIGS. 19-22. The embodiment of FIGS. 19-22 is generally similar to the embodiment of FIGS. 1-10 with the exception that the reservoir and cylinder are formed as a unitary molded member rather than being formed as separate members with the reservoir separably mounted on the cylinder, Specifically, the cylinder 100, in addition to a relatively large diameter rearward portion 100a and a relatively small diameter forward portion 100b, further includes a reservoir portion 100c molded integrally with forward portion 100b so as to form, as best seen in FIG. 19, a generally FIG. 8 configuration with one portion of the FIG. 8 constituting the relatively small diameter forward portion of the cylinder and the other portion of the FIG. 8 defining the reservoir. The forward cylinder portion 100b and reservoir portion 100c are molded with open forward ends. Cylinder portion 100b includes a discharge fitting 100d defining a discharge port 100e, and a partition 100f is provided adjacent but spaced rearwardly from the open forward end of cylinder portion 100b. The open forward ends of cylinder portion 100b and reservoir portion 100c are closed by an end cap 102, seen as a separate element in FIG. 21 and seen in its assembled relation to the cylinder in FIG. 18 and 20. End cap 102 includes a main body portion 102a, an annular reservoir closure portion 102b, and an annular cylinder closure portion 102c. In the assembled relation of the end cap and the cylinder, annular reservoir closure portion 102b is fitted into the open forward end of reservoir portion 100c and traps the annular lip 60a of the elastomeric diaphragm 60 positioned within the reservoir, and annular cylinder closure portion 102c is fitted into the open forward end of cylinder portion 100b and coacts with an O-ring 104 to preclude leakage of fluid out of the open end of cylinder portion 100b. With end cap 102 in place, fluid communication is established between the internal bore 100g of cylinder portion 100b and the internal bore 100h of reservoir portion 100c by a central reservoir port 100i provided in partition 100f, a chamber 100j defined rearwardly of end cap 102 and forwardly of partition 100f, and an angled reservoir discharge port 100k extending between chamber 100j and reservoir bore 100h. It will be understood that a piston and valve assembly of the general type disclosed in the FIGS. 1-10 embodiment is also included in the FIGS. 18-21 embodiment so that communication is blocked between cylinder portion 100b and reservoir portion 100c in response to forward, stroking movement of piston rod 34 and communication between reservoir portion 100c and cylinder portion 100b is reestablished upon rearward, retracting movement of piston rod 34.

The invention master cylinder assembly will be seen to provide many important advantages. The piggyback mounting of the reservoir on the cylinder 342 provides an extremely compact package and thereby facilitates installation in the extremely cramped environments of modern day motor vehicles. The pivotal mounting of the reservoir on the cylinder allows the cylinder and reservoir to be readily and inexpensively assembled so as to provide a relatively inexpensive final product. The simple manner in which the reservoir and cylinder pivotally and sealingly coact enables the master cylinder assembly to be delivered as a permanently sealed unit to the motor vehicle manufacturer and thereby allows the unit to be installed in the passenger compartment of the motor vehicle without fear of contamination of the passenger compartment during the course of attempts to service the master cylinder assembly. The compact nature of the master cylinder assembly also allows it to be installed in the relatively crowded and confined environment of the passenger compartment. The two-step bore of the master cylinder allows the external mounting flange of the master cylinder to be provided at the juncture of the small diameter and large diameter bores so that any sink marks created on the internal bores as a result of the draw created by the mounting flange in the molding process will not interfere with the smooth reciprocal sliding movement of the piston within the cylinder. And the multi-step bore also provides a convenient and positive means of defining the extreme forward position of the piston within the cylinder by allowing the annular shoulder on the piston to seat against the annular shoulder defined at the juncture between the large diameter bore portion and the small bore diameter bore portion. The multi-step bore also simplifies the plastic molding operation of the cylinder by minimizing the length of bore along which the bore dimensions must be carefully controlled during the molding process.

Whereas preferred embodiments of the invention have been illustrated and described in detail, it will be apparent that various changes may be made in the disclosed embodiments without departing from the scope or spirit of the invention.

We claim:
1. A hydraulic cylinder assembly comprising:
(A) a cylinder having a central axial bore and including a forward end, a rearward end, a discharge port adjacent said forward end, and a reservoir port adjacent said forward end;
(B) a piston mounted for sliding reciprocal axial movement in said bore and operative to discharge pressure fluid through said cylinder discharge port in response to movement of said piston in said bore from a rearward retracted position to an extreme forward position spaced rearwardly of said cylinder reservoir port; and
(C) an elongated reservoir having an elongated body defining a central axial bore and including a rearward end and a discharge port adjacent its forward end;
(D) said reservoir being positioned in piggyback fashion on said cylinder with said bores extending generally parallel and in laterally offset relation to each other and with said reservoir discharge port connected to said cylinder reservoir port to provide fluid communication between said reservoir bore and said cylinder bore proximate the forward end of said cylinder assembly.

2. A cylinder assembly according to claim 1 wherein:
(E) said central axial bore of said cylinder includes a relatively large diameter rearward portion and a relatively small diameter forward portion forming a rearwardly facing annular bore shoulder surface at its juncture with said rearward bore portion.

3. A hydraulic cylinder assembly according to claim 1 wherein said cylinder and said reservoir are filled with hydraulic fluid prior to shipment to a motor vehicle manufacturer for assembly on a motor vehicle.

4. A hydraulic cylinder assembly comprising:
(A) a cylinder having a central axial bore and including a forward end, a rearward end, a discharge port adjacent said forward end, and a reservoir port adjacent said forward end;
(B) a piston mounted for sliding reciprocal axial movement in said bore; and
(C) an elongated reservoir having a central axial bore and including a rearward end a discharge port adjacent its forward end;
(D) said reservoir being positioned in piggyback fashion on said cylinder with said bores extending generally parallel to each other and with said reservoir discharge port connected to said cylinder reservoir port to provide fluid communication between said reservoir bore and said cylinder bore;
(E) said assembly further including means mounting said reservoir in piggyback fashion on said cylinder; and
(F) said mounting means including first coacting means on said rearward end of said reservoir and on said cylinder mounting said rearward end of said reservoir for pivotal movement relative to said cylinder about a pivot axis generally normal to the axis of said cylinder bore.

5. A cylinder assembly according to claim 4 wherein:
(G) said mounting means includes second coacting means on said forward end of said reservoir and on said forward end of said cylinder operative in response to pivotal movement of said rearward end of said reservoir about said pivot axis to connect said reservoir discharge port to said cylinder reservoir port.

6. A cylinder assembly according to claim 5 wherein:
(H) said second coacting means comprises a fitting on said forward end of said reservoir defining said discharge port and a fitting on said forward end of said cylinder defining said reservoir port and movable into telescopic relation with said reservoir fitting in response to pivotal movement of said rearward end of said reservoir about said pivot axis.

7. A cylinder assembly according to claim 6 wherein:
(I) said second coacting means further includes an external annular groove in one of said fittings and a pin carried by the other fitting and tangentially mounted in said external groove.

8. A cylinder assembly according to claim 6 wherein:
(I) said cylinder reservoir fitting is sized to telescopically receive said reservoir discharge fitting.

9. A cylinder assembly according to claim 4 wherein:
(G) said central axial bore of said cylinder includes a relatively large diameter rearward portion and a relatively small diameter forward portion forming a rearwardly facing annular bore shoulder surface at its juncture with said rearward bore portion; and
(H) said first coacting means on said cylinder includes journal means disposed radially outwardly of the outer surface of said cylinder proximate the juncture of said large diameter and small diameter bore portions.

10. A cylinder assembly according to claim 9 wherein:
(I) said cylinder includes an annular radially extending exterior mounting flange proximate said bore juncture; and
(J) said journal means is provided on said mounting flange.

11. A cylinder assembly according to claim 10 wherein:
(K) said journal means comprises an arcuate forwardly opening concave journal surface on said mounting flange; and
(L) said first coacting means on said rear end of said reservoir comprises an arcuate rearwardly facing convex journal surface sized to journal in said concave journal surface on said mounting flange.

12. A cylinder assembly according to claim 9 wherein:
(I) said cylinder assembly further includes a piston having a relatively small diameter forward portion mounted for sliding reciprocal movement in said cylinder forward bore portion, a relatively large diameter rearward portion mounted for reciprocal sliding movement in said cylinder rearward bore portion, and a forwardly facing annular shoulder surface coacting with said bore shoulder surface to define the extreme forward position of said piston in said bore.

13. A hydraulic cylinder assembly comprising:
(A) an elongated cylinder having a central axial bore, a forward end, a rearward end, and an external mounting flange intermediate its ends; and
(B) an elongated reservoir positioned in piggyback fashion on said cylinder and extending generally between said flange and said forward end of said cylinder;
(C) the rearward end of said reservoir being pivotally mounted on said mounting flange;
(D) said cylinder including a fitting adjacent its forward end defining a reservoir port; and
(E) said reservoir including a fitting adjacent its forward end mounted in telescopic relation to said cylinder fitting and coacting with said cylinder fitting to provide fluid communication between said reservoir and said cylinder.

14. A motor vehicle control assembly comprising:
(A) a bracket structure;
(B) a pedal including a pedal arm pivotally mounted proximate its upper end to said bracket structure and having a pedal pad at its lower end;
(C) a hydraulic cylinder assembly including a hollow cylinder having a central axial bore and including an open rearward end and a closed forward end, a piston slidably mounted in said cylinder bore, a piston rod connected at its forward end to said piston and extending out of the open rearward end of said cylinder, and an elongated reservoir positioned in piggyback fashion on said cylinder; and
(D) means mounting said master cylinder assembly on said bracket assembly with the rearward end of said piston rod pivotally connected to said pedal arm;
(E) said reservoir defining a central axial bore and being positioned in piggyback fashion on said cylinder with said cylinder and said reservoir bores extending generally parallel to each other;
(F) said cylinder including an external annular flange between its forward and rearward ends;

(G) said reservoir extending along said cylinder from said flange to a location proximate said forward end of said cylinder;

(H) said cylinder assembly being mounted on a plate portion of said bracket structure; and (I) the portion of said cylinder rearwardly of said flange passing rearwardly through an aperture in said bracket structure plate portion with said flange positioned against the forward face of said plate portion to position said reservoir, and the portion of said cylinder forwardly of said flange, forwardly of said plate portion.

15. A vehicle control assembly according to claim 14 wherein:

(J) the rearward end of said reservoir is pivotally mounted on said annular flange;

(K) said cylinder includes a fitting adjacent its forward end defining a reservoir port; and (L) said reservoir includes a fitting adjacent its forward end mounted in telescopic relation to said cylinder fitting and coacting with said cylinder fitting to provide fluid communication between said reservoir bore and said cylinder bore.

16. A hydraulic cylinder assembly comprising:

(A) a cylinder having a central axial bore and including a forward end, a rearward end, a discharge port adjacent said forward end, and a reservoir port adjacent said forward end;

(B) a piston mounted for sliding reciprocal axial movement in said bore; and (C) an elongated reservoir having an elongated body defining a central axial bore and including a rearward end and a discharge port adjacent its forward end;

(D) said reservoir being positioned in piggyback fashion on said cylinder with said bores extending generally parallel and in laterally offset relation to each other and with said reservoir discharge port connected to said cylinder reservoir port to provide fluid communication between said reservoir bore and said cylinder bore proximate the forward end of said cylinder assembly;

(E) said cylinder forward end being closed by an end wall;

(F) said reservoir port opening centrally in said end wall;

(G) said cylinder assembly further including valving means for coaction with said reservoir port, a valve stem mounting said valving means at its forward end and extending rearwardly in said bore from said valving means for connection at its rearward end to the forward end of said piston, and means operative in response to forward movement of said piston to move said valving means into sealing coaction with said reservoir port and operative in response to rearward movement of said piston to move said valving means out of sealing coaction with said reservoir port.

17. A hydraulic cylinder assembly comprising:

(A) a hollow cylinder having a rearward end and a forward end and defining a central bore including a relatively large diameter cylindrical rearward portion, defined by a cylindrical wall surface that is inviolate for the entire length of said large diameter bore portion, and a relatively small diameter cylindrical forward portion forming a rearwardly facing annular shoulder surface at its juncture with said rearward bore portion and being defined by a cylindrical wall surface that is inviolate for the entire length of said small diameter forward bore portion except for a discharge port proximate the forward end thereof; and (B) a piston having a relatively small diameter forward portion mounted for sliding reciprocal movement in said forward bore portion and a relatively large diameter rearward portion mounted for reciprocal sliding movement in said rearward portion and including a forward annular shoulder surface coacting with said bore shoulder surface to define the extreme forward position of said piston in said bore;

(C) said cylinder forward end being closed by an end wall and a reservoir port opening centrally in said end wall, said cylinder assembly further including valving means for coaction with said reservoir port, a valve stem mounting said valving means at its forward end and extending rearwardly in said relatively small diameter bore portion from said valving means for connection at its rearward end to the forward end of said piston, means operative in response to forward movement of said piston to move said valving means into sealing coaction with said reservoir port and operative in response to rearward movement of said piston to move said valving means out of sealing coaction with said reservoir port, and an elongated reservoir having a central axial bore and including a rearward end and a discharge port adjacent its forward end;

(D) said reservoir being positioned in piggyback fashion on said cylinder with said bores extending generally parallel to each other and with said reservoir discharge port connected to said cylinder reservoir port to provide fluid communication between said reservoir bore and said cylinder bore.

18. A hydraulic cylinder assembly comprising:

(A) a cylinder having a central axial bore and including a forward end, a rearward end, a discharge port adjacent said forward end, and a reservoir port adjacent said forward end;

(B) a piston mounted for sliding reciprocal axial movement in said bore; and (C) an elongated reservoir having an elongated body defining a central axial bore and including a rearward end and a discharge port adjacent its forward end;

(D) said reservoir being positioned in piggyback fashion on said cylinder with said bores extending generally parallel and in laterally offset relation to each other and with said reservoir discharge port connected to said cylinder reservoir port to provide fluid communication between said reservoir bore and said cylinder bore proximate the forward end of said cylinder assembly;

(E) said central axial bore of said cylinder including a relatively large diameter rearward portion and a relatively small diameter forward portion forming a rearwardly facing annular shoulder bore surface at its juncture with said rearward bore portion;

(F) said cylinder assembly further including a piston having a relatively small diameter forward portion mounted for sliding reciprocal movement in said cylinder forward bore portion, a relatively large diameter rearward a portion mounted for reciprocal sliding movement in said cylinder rearward bore portion, and a forwardly facing annular shoulder surface coacting with said bore shoulder surface to define the extreme forward position of said piston in said bore.

* * * * *